United States Patent [19]

Jones

[11] 4,112,438
[45] Sep. 5, 1978

[54] METHOD AND PROJECTION APPARATUS
[76] Inventor: Dale A. Jones, 11A Bayview La., Huntington, N.Y. 11743
[21] Appl. No.: 816,443
[22] Filed: Jul. 18, 1977
[51] Int. Cl.² .................. G03B 21/06; G03B 21/28
[52] U.S. Cl. .................................. 353/66; 353/121; 353/28; 353/99
[58] Field of Search .............. 353/1, 28, 29, 65, 66, 353/121, 122, 99

[56] References Cited
U.S. PATENT DOCUMENTS

| | | | |
|---|---|---|---|
| 1,349,580 | 8/1920 | Paradis | 353/29 X |
| 2,193,518 | 3/1940 | Lubin | 33/1 K |
| 2,198,051 | 4/1940 | Jordan | 353/1 |
| 3,512,883 | 5/1970 | Noble | 353/66 |

*Primary Examiner*—Harry N. Haroian
*Attorney, Agent, or Firm*—Bauer, Amer & King

[57] ABSTRACT

An apparatus and method for constructing a completed image from an incomplete selected sample and for the projection of the image onto a surface upon which an article has been affixed so as to permit the viewing of the article as if the same were positioned in conjunction with the completed image. More specifically, the completed image may be formed from an incomplete framing sample.

23 Claims, 3 Drawing Figures

METHOD AND PROJECTION APPARATUS

BACKGROUND OF THE INVENTION

This invention relates generally to a projection apparatus and method for projecting a completed image of an incomplete object. More specifically, the invention may relate to an apparatus for forming an image of a completed picture frame from a selected framing sample and the projection of the image about an article to be framed.

The person seeking to frame an article, as for example a painting or photograph, is today often confronted with literally hundreds of variations in the color, design, ornamentation and material of construction that can be employed in the completed frame. Since typical space limitations do not permit a framing store to maintain a large stock of completed frames, a selection of small corner sections of the frame designs and matte surfaces available is generally maintained. After a customer has selected a particular design, the frame and matte are custom made to meet the dimensional requirements of the article. The problem of attempting to visualize the article as it will finally appear when surrounded by an imaginary frame constructed in accordance with the selected sample corner frame section often makes frame selection a frustrating and uncertain experience. Until the complete frame is constructed about the article, the purchaser cannot be sure that he has selected an appropriate frame design therefor. If, indeed, a mistake in selection has been made, there is generally little that can be done at that time.

It is, therefore, an object of the present invention to provide an apparatus to facilitate the selection of an incomplete object and to project an image of it in completed form relative to an article with which a like completed object will be used so as to enable the viewer to see their relationship before the combination is actually made.

It is another object of the present invention to provide an apparatus to facilitate the selection of a picture frame design for a particular article to be framed.

It is a further object of the present invention to provide such an apparatus to simulate the appearance of a completed frame from a selected sample corner section.

It is yet another object of the present invention to provide such an apparatus to simulate the appearance of a completed frame of a selected design about an article to be framed.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF THE DRAWINGS

In the drawings, wherein similar reference characters denote similar elements throughout the several views.

DETAILED DESCRIPTION OF THE PREFERRED EMBODIMENT

Figure 1:
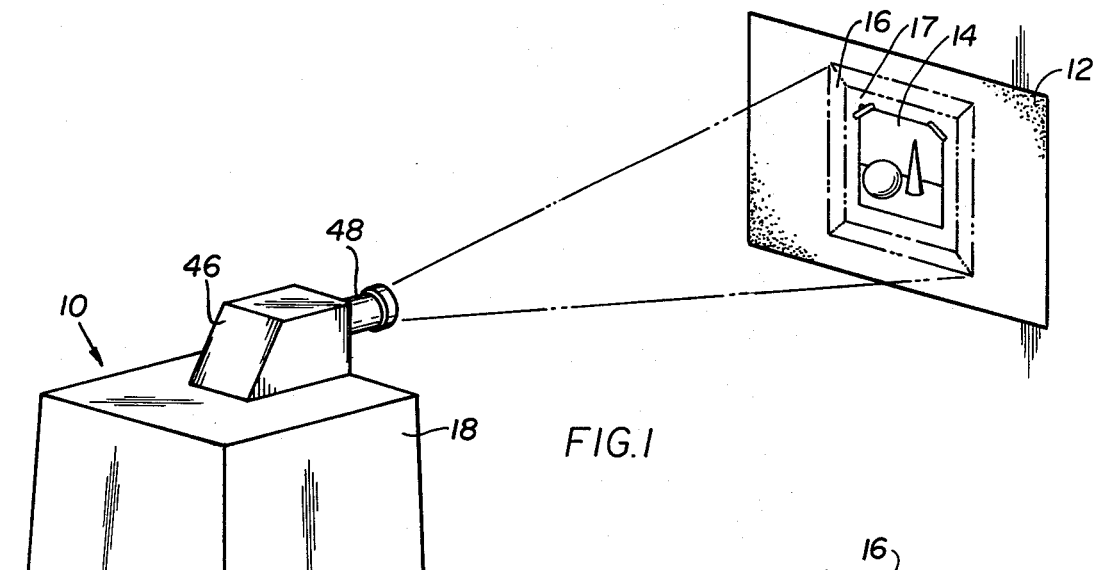
FIG. 1 is a diagrammatic view of a projection apparatus constructed in accordance with the teaching of the present invention illustrating its manner of use in accordance therewith.

The projection apparatus of the present invention is constructed so as to enable the formation and projection of a completed image of a selected incomplete object. The completed image may be projected relative to an article to permit the viewing of the article in conjunction with the image as if the incomplete object were in its completed form. Although the embodiment shown in the drawing is described in relation to a particular application therefor, it should be understood that such application is illustrative only and is not meant to limit the scope of the invention herein disclosed which is of general utility.

More particularly and referring now to the drawing, there is illustrated a projection apparatus, generally identified by the numeral 10, embodying the teaching of the present invention. The projection apparatus 10 is shown in FIG. 1 operatively arranged for use. Specifically, the apparatus 10 is positioned near a wall or similar surface 12 upon which an article to be framed has been detachably mounted by any convenient means. Typically, the article will be a picture 14, as for example a photograph, painting or the like, although it will become clear as this description proceeds that any two or three dimensional object that is suitable for framing may be used with the projection apparatus 10 of the present invention. An image of a complete frame 16 and matte 17 is projected by the apparatus 10 in a manner to be described about the picture 14, permitting a prospective frame purchaser to view the picture 14 as it will ultimately appear when the picture is mounted in a completed frame. Thus, the projection apparatus 10 of the present invention enables a prospective frame purchaser to see what a selected frame and what a selected matte in combination therewith will look like on the actual picture before the frame and/or the matte are made up and manufactured.

Figure 2:
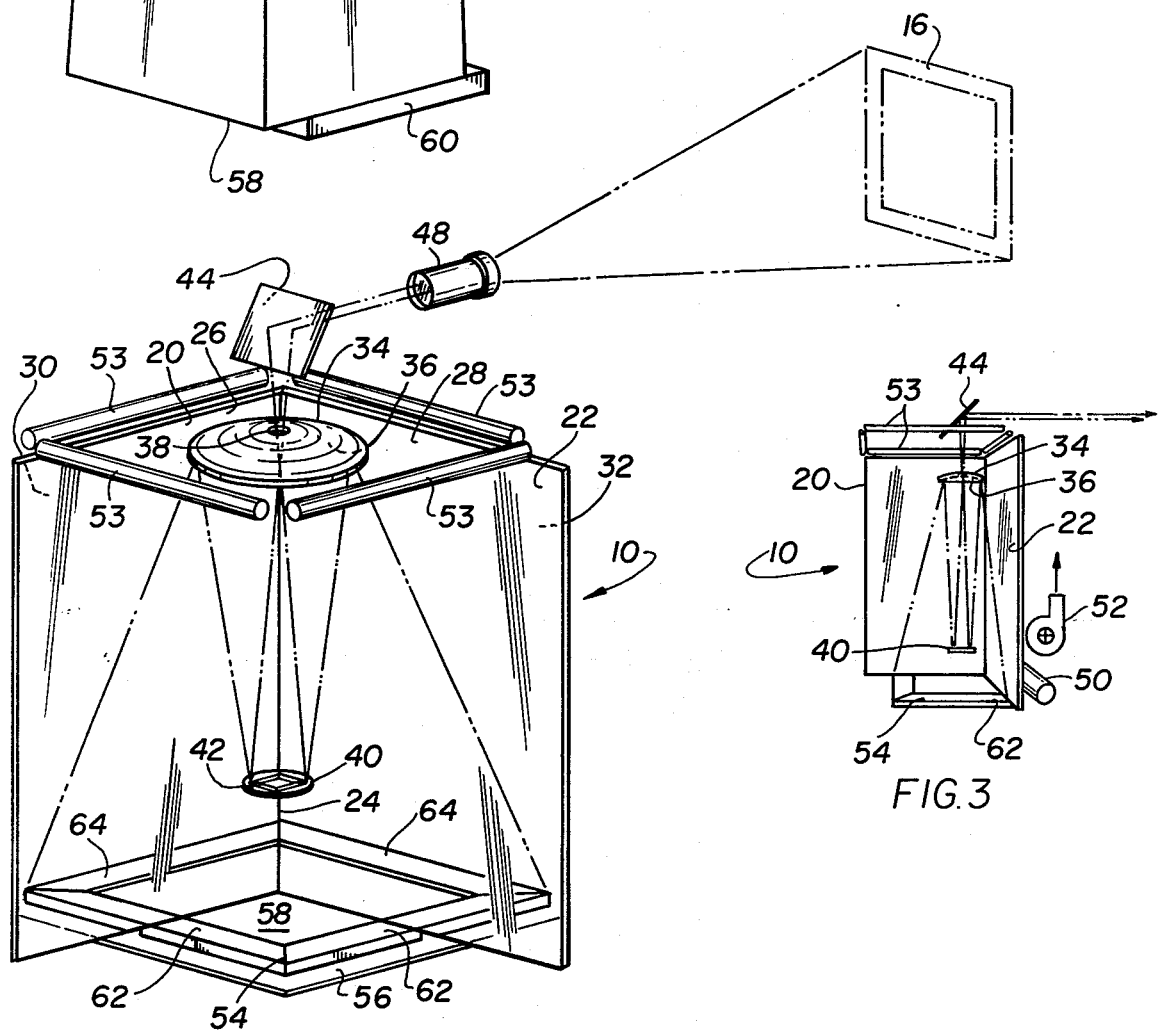
FIG. 2 is a perspective view of the projection apparatus of FIG. 1 with the housing thereof removed.
Figure 3:
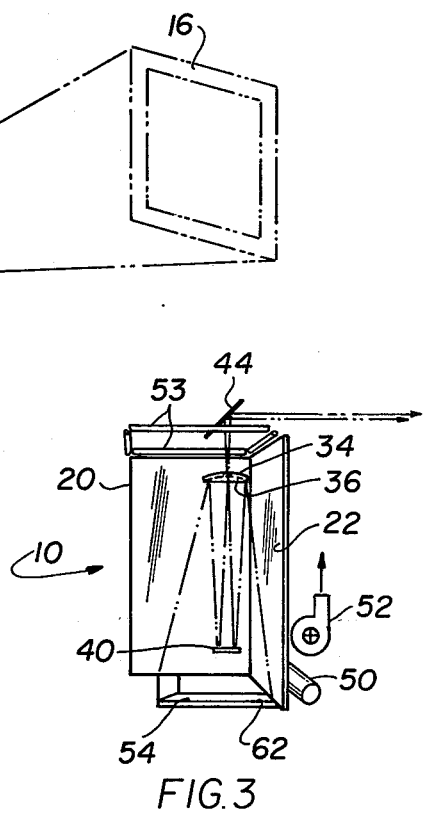
FIG. 3 is a side elevational view of the details of FIG. 2 in reduced scale.

To accomplish this, a housing 18 is provided, wherein a pair of vertically-disposed reflective surfaces 20, 22 are positioned substantially perpendicular to each other, as seen in FIGS. 2 and 3 which depict the interior arrangement of the various components in the housing 18. Surfaces 20, 22 are joined along a merger line 24 to position the reflecting surface 20 contiguous with the reflecting surface 22. For reasons that will become apparent as this description proceeds, the surfaces 20, 22 are preferably fabricated as half-silvered mirrors, having their respective front surfaces 26, 28 silvered to reflect incident light and their respective rear surfaces 30, 32 unsilvered to enable the transmission of light therethrough.

A parabolic reflector 34, preferably circularly configured, is substantially horizontally positioned so as to place its concave surface 36 in a downward orientation. The material of construction of the reflector 34 is a matter of design choice and, therefore, a silvered glass surface or a highly polished metallic sheet may be employed, the essential characteristic being that the concave surface 36 thereof be reflective to light rays incident thereon.

The parabolic reflector 34 is located substantially equi-distant from each of the reflective surfaces 20, 22 and is preferably provided with a substantially centrally positioned aperture 38 therein. Alternatively, a silvered glass parabolic reflector 34 having a non-silvered portion corresponding to the aperture 38 at its center for the transmission of light rays therethrough could be employed. Parabolic reflector 34 is preferably further positioned proximate the upper ends of the reflective surfaces 20, 22 to facilitate its cooperation with other elements of the projection apparatus 10 in a manner to be described.

A flat reflective member 40, preferably circular in configuration and of lesser diameter than that of the parabolic reflector 34, is horizontally positioned beneath the parabolic reflector 34 and substantially equidistant from each of the reflective surfaces 20, 22. For reasons that will become clear as this description proceeds, member 40 and parabolic reflector 34 are so aligned as to position an imaginary line connecting their centers substantially parallel with the merger line 24 of the reflective surfaces 20, 22. Furthermore, the distance between the member 40 and the parabolic reflector 34 should be substantially one-half the focal length of the concave surface 36 of the latter. The reflective member may be constructed of any convenient reflective material such as silvered glass or a finely polished metallic surface to provide an upper reflective surface 42 thereon.

Positioned above the parabolic reflector 34 is a mirror surface 44. Again, the material of construction of the surface 44 is not important to the operation of the apparatus 10, and any of the modes of construction heretofore mentioned may be employed. Mirror surface 44 is advantageously angled relative to a horizontal plane. The surface 44 is preferably flat and, although depicted as squarely configured, it need not be so constructed. Conveniently, the mirror surface 44 may be mounted on the interior of a wall portion 46 on the projector housing 18 shown in FIG. 1. It should be understood that the aforementioned imaginary line through the centers of the parabolic reflector 34 and the reflective member 40 should pass through the center of the mirror surface 44 for proper operation of the apparatus 10 in a manner to be described.

A projection lens 48 is mounted on the housing 18 so as to convey optical images from the interior of the housing to the exterior thereof. The lens 48 is preferably provided as a zoom or variable lens to permit the variation of the focal length thereof.

In conjunction with the preferred provision of half-silvered reflective surfaces 20, 22, an illuminating means, as for example a lamp 50, is located adjacent the rear surface 32 of the reflective surface 22. It should be clear that the lamp 50 may alternatively be positioned adjacent the rear surface 30 of reflective surface 20, or two lamps 50 may be employed, one adjacent each of the rear surfaces 30, 32. A fluorescent-type lamp may be advantageously employed to minimize the radiation of heat therefrom and to conform to space requirements within the housing 18. A fan or blower 52 may be provided proximate the lamp 50 to provide increased circulation of air in the housing 18 and prevent the accumulation of excessive heat therein.

It should be noted that absent the preferred provision of a lamp 50 at the location shown in FIG. 3, the necessity of providing the reflective surfaces 20, 22 as half-silvered mirrors to permit the transmission therethrough of illumination from the lamp is obviated. In such an alternative embodiment, the reflective surfaces 20, 22 may be constructed of a single sheet of a suitable metal or like material having one surface finely polished, the sheet then being bent to form the surfaces 20, 22 at right angles to each other with the front reflective surfaces 26, 28 contiguous. Illumination of the interior of the housing 18 could alternatively be accomplished, by way of example, through the provision of a suitably positioned opening in the surface of the housing 18, to enable the entry of ambient light into the interior thereof (not shown).

In practice, it has been found that the illuminating means 50, as illustrated in FIG. 3 of the drawing, sometimes may prove to be inadequate for the purpose of fully illuminating large, deeply-grooved framing samples. To avoid this problem as well as to enhance the illumination of the framing sample and to produce desired highlighting effects, there may be provided an additional peripherally arranged illuminating means 53 substantiallly at the top of the reflecting surfaces 20 and 22 as clearly shown in FIGS. 2 and 3. The additional illuminating means 53 may be substituted in use for the lamp 50 or may be used in addition thereto. At times, the use of the lamp 50 may be desirable to provide certain desired highlighting effects. At other times, the illuminating means 53, which may be substantially circular in configuration and may consist of several fluorescent lamps circumposed about the top of the reflecting surfaces 20, 22, as shown, may be utilized to provide different and fuller illumination of the frame sample.

It will be recognized that various effects can be obtained by utilizing one or both of the illuminating means 50 and 53. Additional illuminating means may also be provided within the scope of the teaching of the invention. Such illuminating means, although not shown, may be provided about the parabolic reflector 34. In such case, a circular fluorescent lamp may be utilized in the same manner as the larger encircling illuminating means 53. The larger peripheral illuminating means 53 may be duplicated along a lower portion of the reflector surfaces 20 and 22 or it could be movable to a lower position relative to the frame sample so as to provide different selected highlighting effects. Hence, the illuminating means shown and the location(s) thereof should not constitute a limitation upon the invention except that it should be recognized that the same may be varied relative to the reflective surfaces 20, 22 and the framing sample to produce the desired image and highlights.

In operation, a selected framing corner sample 54 and, if desired, a selected matte sample 56, is positioned in a space or clearance 58 beneath the reflecting surfaces 20, 22. An offset base portion 60 (FIG. 1) may conveniently be provided at the bottom of the housing 18 to provide the clearance area 58 under the reflective surfaces 20, 22 in order to enable the placement of the corner sample 54 thereunder and to align the sample 54 relative thereto. As will become clearer as this description proceeds, the ability to move portions of the legs 62 of the corner sample 54 under the reflective surfaces 20, 22 and out of their reflective range permits the user to vary the relative dimensions of adjacent legs of the frame image 16 projected onto the wall surface 12 to conform the image 16 to the picture 14. Thus, the same corner sample 54 may be used to project a frame image 16 about a square picture or about a rectangular picture, in each case conforming the projected image 16 to the shape of the picture 14.

The lamp 50, located adjacent the non-silvered or light transmitting rear surface 32 of the reflective surface 22, provides illumination of an object positioned between the reflective surfaces 20, 22. The result of placing the framing corner section 54 in the area bounded by the reflective surfaces 20, 22 as shown in FIG. 1 is the reflection of the corner section 54 in the surfaces 20, 22 to optically complete an image of a full frame constructed from the incomplete section 54. This completed image is received by the concave reflective surface 36 of the parabolic reflector 34, as illustrated by the broken lines in FIGS. 2 and 3. The parabolic reflector 34 therefore "sees" the corner section 54 and its reflection or virtual image 64 in the surfaces 20, 22 as continuations of each other or, in other words, as a single object.

The completed image is reflected by the parabolic reflector 34 in condensed form onto the upper surface 42 of the flat reflective member 40. The advantageous alignment of the member 40 and the mirror surface 44 with the parabolic reflector 34, as described heretofore, causes the condensed image to be reflected from the member 40, through the aperture 38 in the parabolic reflector 34 and onto the angled surface 44. It should be noted that the spacing between the member 40 and the parabolic reflector 34 places the focal point of the latter substantially at its central aperture 38, minimizing its possible interference with the completed image due to any slight positional misalignment thereof.

The image is directed from mirror surface 44 onto the lens 48, which projects the completed frame image 16 onto the wall surface 12 about the picture 14 demountably affixed thereto. Varying the focal length of the lens 48 will size the projected image 16 to conform to the dimensions of the picture 14, and provide a clear indication of how the completed frame will appear when ultimately constructed and fixed about the picture 14.

There has thus been shown and described an apparatus for the formation and projection of a completed image of a selected incomplete object. The apparatus is unusually simple to operate to enable a prospective purchaser of, for example, a picture frame to use it without extensive assistance from a salesperson. It should be apparent that its operation is by no means restricted to forming completed images of incomplete rectangular samples—objects having many other shapes, as for example arcuate or similarly spherical configurations, may be employed as well. Likewise, the exact construction details of the apparatus, as depicted in the drawing, are illustrative only and the apparatus may assume other equivalent configurations within the scope of the inventive disclosure.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is intention, therefore, to be limited only as indicated by the scope of the claims appended hereto.

What is claimed is:

1. In an apparatus for the projection of a completed image of an incomplete object,
   at least two reflective surfaces perpendicularly arranged relative to each other to complete the reflection of an incomplete object positioned in an area partially bounded by said mirrors,
   means for illuminating the incomplete object,
   a parabolic reflector to receive the completed reflection of the incomplete object and to reflect the same in condensed form as a completed image,
   a reflective member receiving said condensed completed image to reflect the same through said parabolic reflector,
   means on said parabolic reflector to permit said condensed completed image to pass through the same, and
   a further reflective means angled to receive said completed reflected image after the same is directed through said parabolic reflector and to reflect the completed image onto a surface such that the image reflected onto a surface appears to be the reflection of a completed image of the incomplete object.

2. In the apparatus of claim 1, a space defined beneath said reflective surfaces to enable the object to be moved relative to said surfaces so as to dimensionally vary parts of the object available for reflection by said reflective surfaces relative to corresponding parts of the object available for reflection so as to vary the relative dimensions of the completed image of the incomplete object.

3. In the apparatus of claim 1,
   said at least two reflective surfaces being contiguous along a line of intersection therebetween.

4. In the apparatus of claim 3,
   said at least two reflective surfaces being half silvered to enable the transmission of light therethrough from the non-silvered surfaces thereof.

5. In the apparatus of claim 4,
   said illuminating means being positioned adjacent said non-silvered surface of one of said reflective surfaces for illuminating the incomplete object to enable the formation of a completed image of the same.

6. In the apparatus of claim 5,
   fan means to effect the circulation of air about said illuminating means.

7. In the apparatus of claim 3, wherein said reflective member receives the condensed image from said parabolic reflector along a line defining an axis therebetween, said axis being substantially parallel to said line of intersection of said at least two reflective surfaces.

8. In the apparatus of claim 1,
   said parabolic reflector being circularly configured.

9. In the apparatus of claim 8,
   said reflective member being circularly configured and having a diameter smaller than that of said parabolic reflector.

10. In the apparatus of claim 1,
    said parabolic reflector having a concave surface in opposed relation to said reflective member.

11. In the apparatus of claim 1,
    said means on said parabolic reflector being an aperture defined thereon.

12. In the apparatus of claim 11,
    said aperture being substantially centrally located on said parabolic reflector.

13. In the apparatus of claim 1,
    lens means for receiving said completed reflected image from said further reflective means and for projection of the image onto a surface.

14. In the apparatus of claim 13,
    said lens means being variably adjustable to permit the size of a projection of said completed reflected image on a surface to be selectively varied.

15. In the apparatus of claim 1,
a housing in which said projection apparatus is encompassed.

16. In an apparatus for simulating the appearance of an article to be framed as it would appear in a completed frame constructed in accordance with a selected sample frame corner section to enable the visualization of the completed frame positioned about the article:
means for illuminating the selected sample frame, corner section,
means for constructing an image of a completed frame from the corner section,
a parabolic reflector to receive the completed image and to reflect the same and including means to permit the passage of the completed image therethrough,
a reflective surface for receiving the completed image from said parabolic reflector and for reflecting the image through said parabolic reflector, and
means for receiving the completed image after its passage through said parabolic reflector and for projecting the completed image onto a surface upon which an article to be framed has been affixed.

17. The apparatus of claim 16, said included means of said parabolic reflector being an aperture to permit the passage of the completed image therethrough.

18. An apparatus for constructing an image of a completed picture frame from a selected frame sample corner section and for projecting the image about an article to be framed, said apparatus comprising:
a housing,
first and second vertically disposed, flat half mirrors in said housing lying in substantially perpendicular intersecting planes merging with each other along the line of intersection of said planes, each of said mirrors having a reflecting surface contiguous with the reflecting surface of the other mirror along the line of intersection, and an opposite surface for the transmission of light therethrough, said mirrors being arranged to form an image of a completed frame from a selected corner section positioned in an area partially bounded by said mirrors,
a space defined relative to said mirrors to enable the movement of the selected corner section relative to said mirrors so as to permit the relative dimensions of said image to be selectively adjusted,
illuminating means disposed adjacent the light transmitting surface of at least one of said mirrors to illuminate the corner section,
a parabolic mirror horizontally positioned adjacent the reflecting surfaces of said first and second mirrors and the line of intersection thereof, and having a concave surface for receiving thereon the completed frame image and for reflecting the same, and a centrally located aperture defined in said parabolic mirror,
a flat reflecting member horizontally disposed to receive the completed frame image in condensed form from the same along an axis parallel to said line of intersection of said first and second mirrors and to reflect the image through the aperture in said parabolic mirror,
a flat reflecting surface angularly disposed in said housing to receive the completed frame image after its passage through the aperture in said parabolic mirror and to reflect the image therefrom,
a variably adjustable lens on said housing for receiving the completed image from said reflecting surface and for projecting the image onto an external surface upon which an article to be framed has been mounted so as to simulate the appearance of an article in a completed frame, whereby the size and relative dimensions of a projection of said completed image on an external surface may be selectively varied to suit the requirements of an article to be framed.

19. The apparatus of claim 18,
said space defined relative to said half mirrors being located beneath the same,
said concave surface of said parabolic mirror being downwardly disposed, and
said reflecting member being positioned below said parabolic mirror and in opposing relation to said concave surface thereon.

20. A method for simulating the appearance of an article to be framed as it would ultimately appear in a completed frame by casting an image of a complete frame about the article from an incomplete selected framing corner sample, comprising the steps of:
selecting a framing corner sample,
constructing an image of a completed frame with the framing corner sample,
projecting the image onto a surface upon which an article to be framed has been mounted to enable the visualization of the completed frame positioned about the article, and
adjusting the projected size of the image to meet the dimensional requirements of the article to be framed.

21. The method of claim 20, further comprising the steps of:
varying the relative dimensions of different parts of the image prior to the projection thereof to conform the projected image to the configuration of the article to be framed.

22. In a method of simulating a frame about an article,
affixing to a surface the article about which a frame is to be simulated,
selecting an incomplete framing sample,
reflecting said incomplete framing sample to form an image of a complete frame,
receiving the image of the complete frame and reflecting the same in condensed form, and
receiving the condensed image and projecting the same onto the surface to which the article to be framed had been affixed to enable the visualization of the article in a completed frame.

23. In an apparatus having at least two reflective surfaces perpendicularly arranged relative to each other, a parabolic reflector, a reflective member and a lens, a method for simulating the appearance of an article to be framed as it would ultimately appear in a completed frame by casting an image of a complete frame about the article from an incomplete selected framing corner sample, comprising the steps of:
selecting a framing corner sample,
positioning the corner sample in an area partially bounded by the reflective surfaces to form an image of a complete frame from the corner sample,
receiving the image of the complete frame on the parabolic reflector and reflecting the image therefrom in condensed form,
receiving the condensed image of the complete frame on the reflective member and reflecting the same through the parabolic reflector, and
receiving the condensed image reflected by the reflective member on the lens and projecting the image therewith onto a surface upon which the article to be framed has been affixed to enable the visulization of the article in a completed frame.

* * * * *